(12) United States Patent
Kuriyama

(10) Patent No.: US 8,225,792 B2
(45) Date of Patent: Jul. 24, 2012

(54) MASK DEVICE WITH BLOWER

(75) Inventor: Satoshi Kuriyama, Tokyo (JP)

(73) Assignee: Koken Ltd., Tokyo (JP)

( * ) Notice: Subject to any disclaimer, the term of this patent is extended or adjusted under 35 U.S.C. 154(b) by 635 days.

(21) Appl. No.: 12/441,424

(22) PCT Filed: Oct. 1, 2007

(86) PCT No.: PCT/JP2007/069175
§ 371 (c)(1),
(2), (4) Date: Mar. 16, 2009

(87) PCT Pub. No.: WO2008/041669
PCT Pub. Date: Apr. 10, 2008

(65) Prior Publication Data
US 2010/0083967 A1  Apr. 8, 2010

(30) Foreign Application Priority Data
Oct. 4, 2006  (JP) .................................. 2006-272994

(51) Int. Cl.
*A62B 18/02* (2006.01)
(52) U.S. Cl. ................................................. 128/206.21
(58) Field of Classification Search ............ 128/206.21, 128/200.24, 204.18, 204.21, 204.22, 204.23, 128/204.26, 205.11, 205.25
See application file for complete search history.

(56) References Cited

U.S. PATENT DOCUMENTS

| | | | |
|---|---|---|---|
| 4,590,951 A | 5/1986 | O'Connor | |
| 5,035,239 A * | 7/1991 | Edwards | 128/205.23 |
| 7,195,015 B2 | 3/2007 | Kuriyama | |
| 2004/0168689 A1* | 9/2004 | Kuriyama | 128/206.15 |
| 2005/0065449 A1* | 3/2005 | Caldwell | 600/538 |

FOREIGN PATENT DOCUMENTS

| | | |
|---|---|---|
| CA | 2147963 | 10/1996 |
| JP | 60049851 U | 4/1985 |
| JP | 60068869 A | 4/1985 |
| JP | 61118618 U | 7/1986 |
| JP | 8299476 A | 11/1996 |
| JP | 09-222544 | 8/1997 |
| JP | 10-028744 A | 2/1998 |
| JP | 11-183775 | 7/1999 |
| JP | 2003-10349 A | 1/2003 |
| JP | 2004-024484 A | 1/2004 |

OTHER PUBLICATIONS

Japanese Office Action for Application No. 2006-272994 issued May 14, 2010.
ISR of PCT/JP2007/069175 dated Dec. 25, 2007.

* cited by examiner

*Primary Examiner* — Loan Thanh
*Assistant Examiner* — Shila Jalalzadeh Abyane
(74) *Attorney, Agent, or Firm* — Lowe & Hauptman Ham & Berner LLP

(57) ABSTRACT

In a mask device with blower, a sensor for warning is disposed, which detects a movement position of an exhaust valve corresponding to the case where an internal pressure of a face body is lower than an outer atmospheric pressure at the time of inhaling air in a non-contact state and outputs a signal. A warning device operates in accordance with a signal that is output from the sensor for warning.

8 Claims, 6 Drawing Sheets

[FIG. 1]
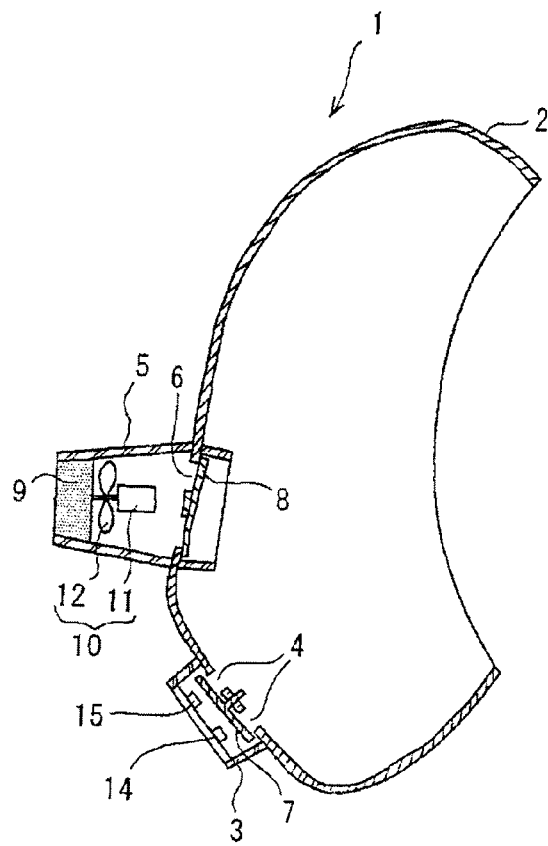
[FIG. 2]
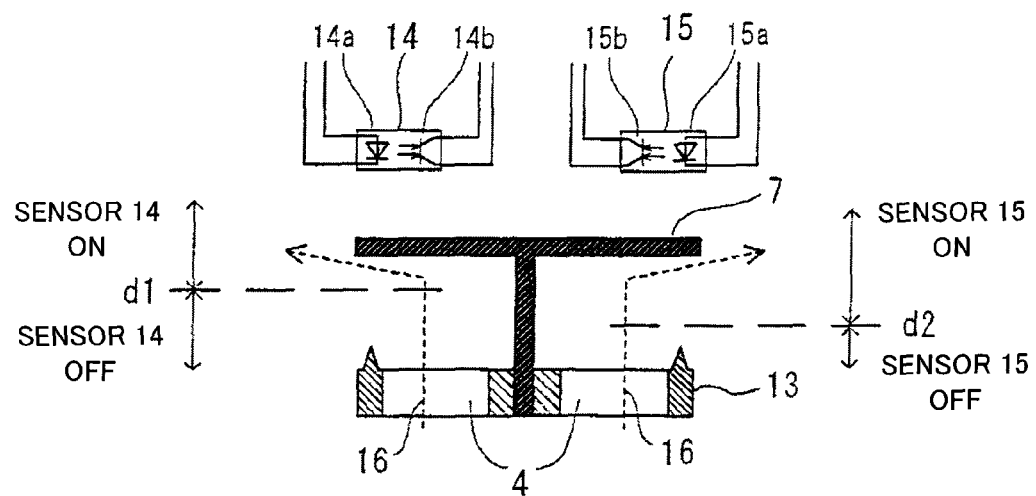

[FIG. 3]
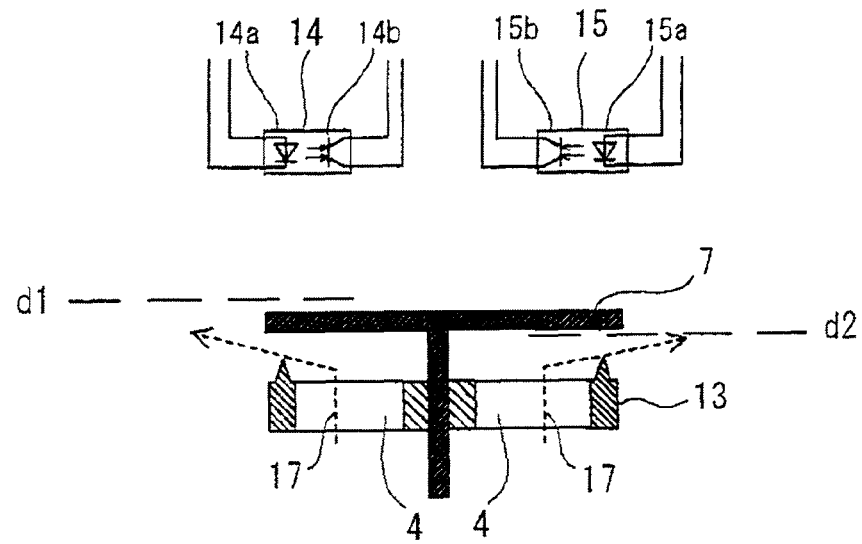
[FIG. 4]
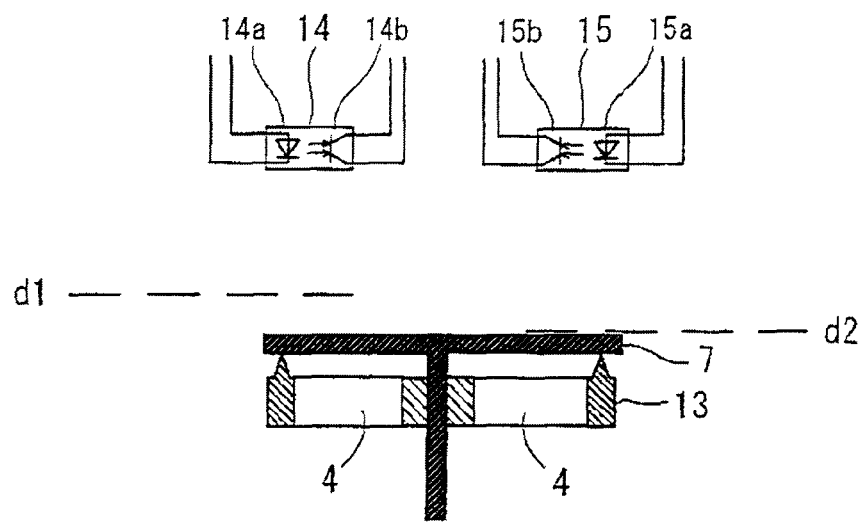

[FIG. 5]
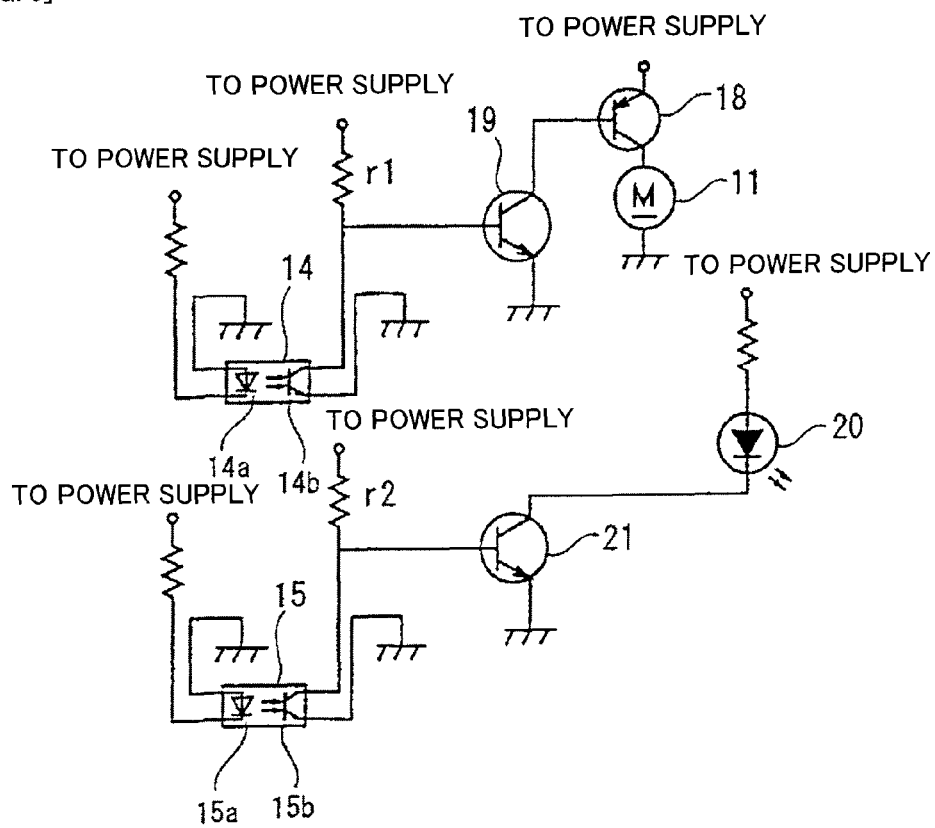
[FIG. 6]
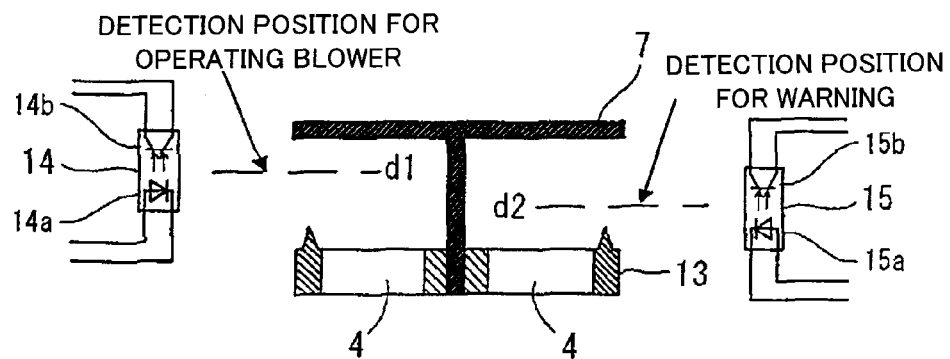

[FIG. 7]
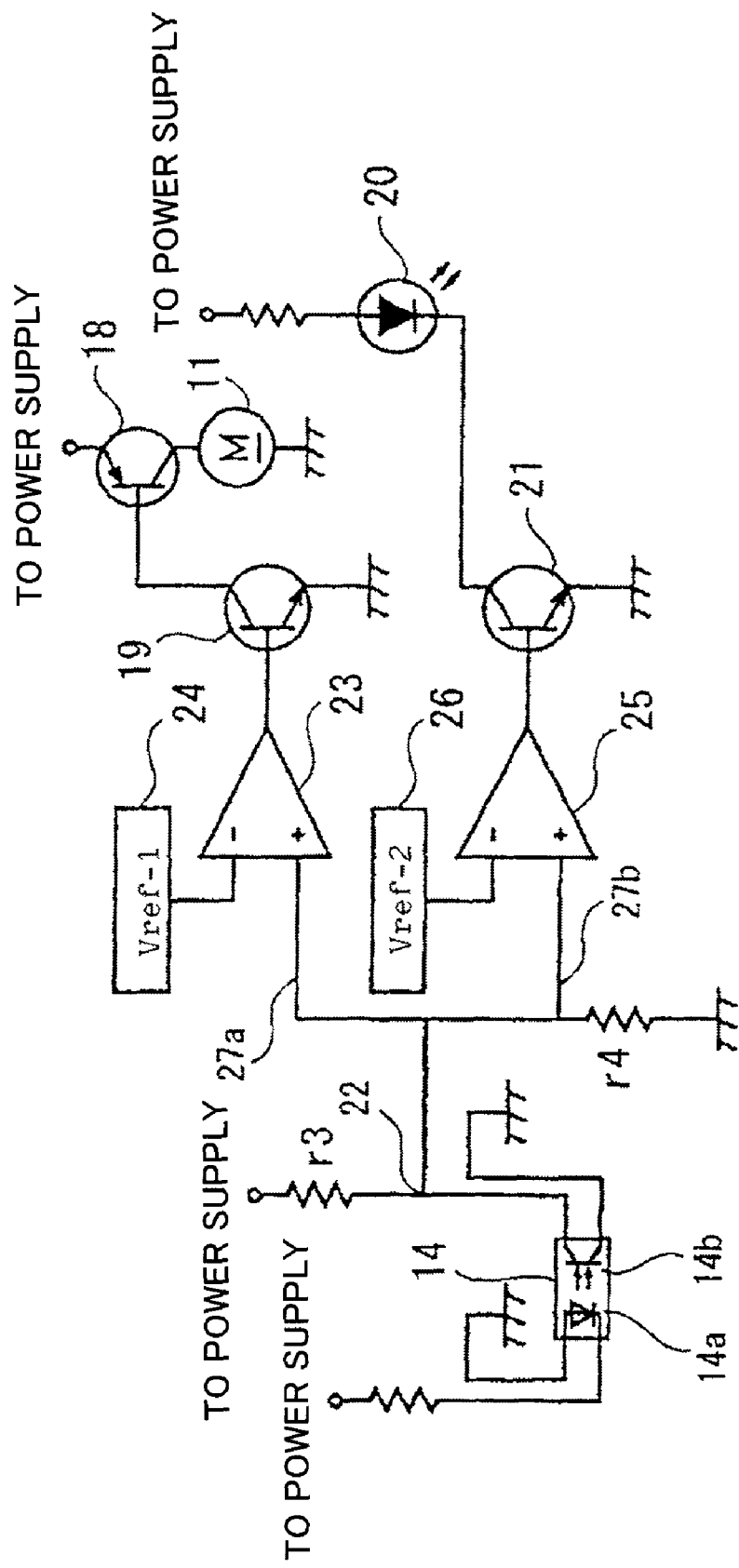

[FIG. 8]
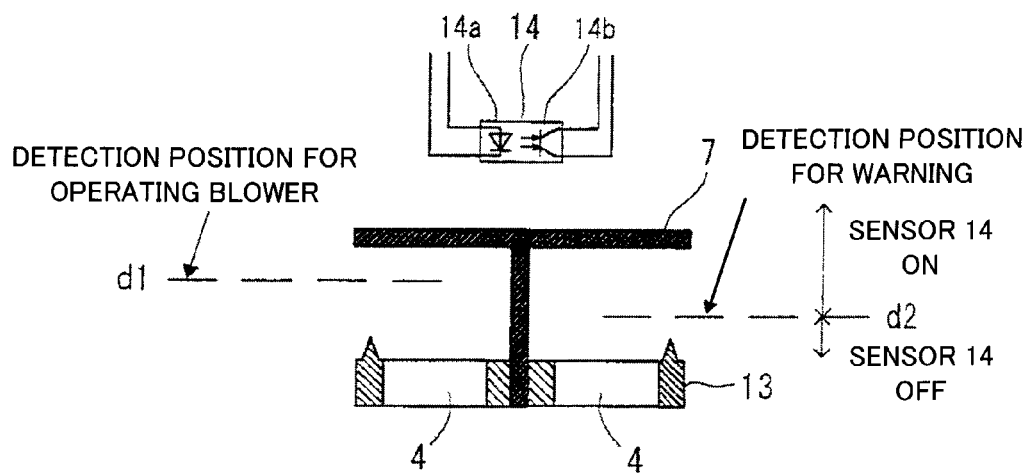
[FIG. 9]
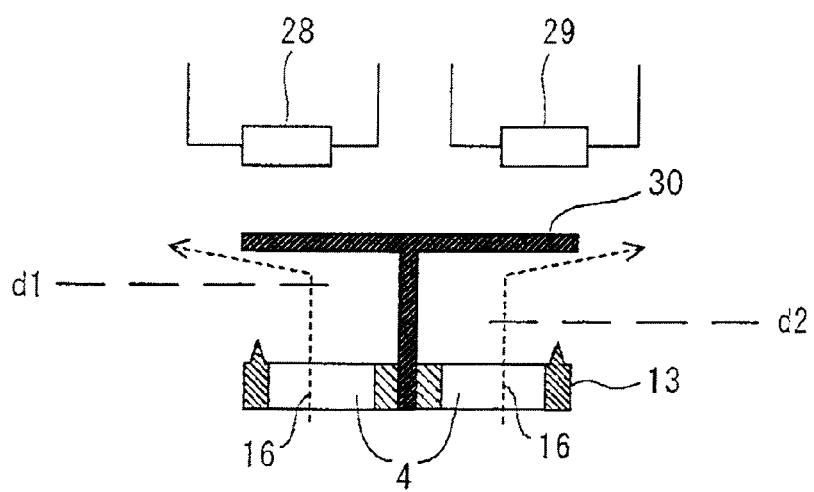

[FIG. 10]
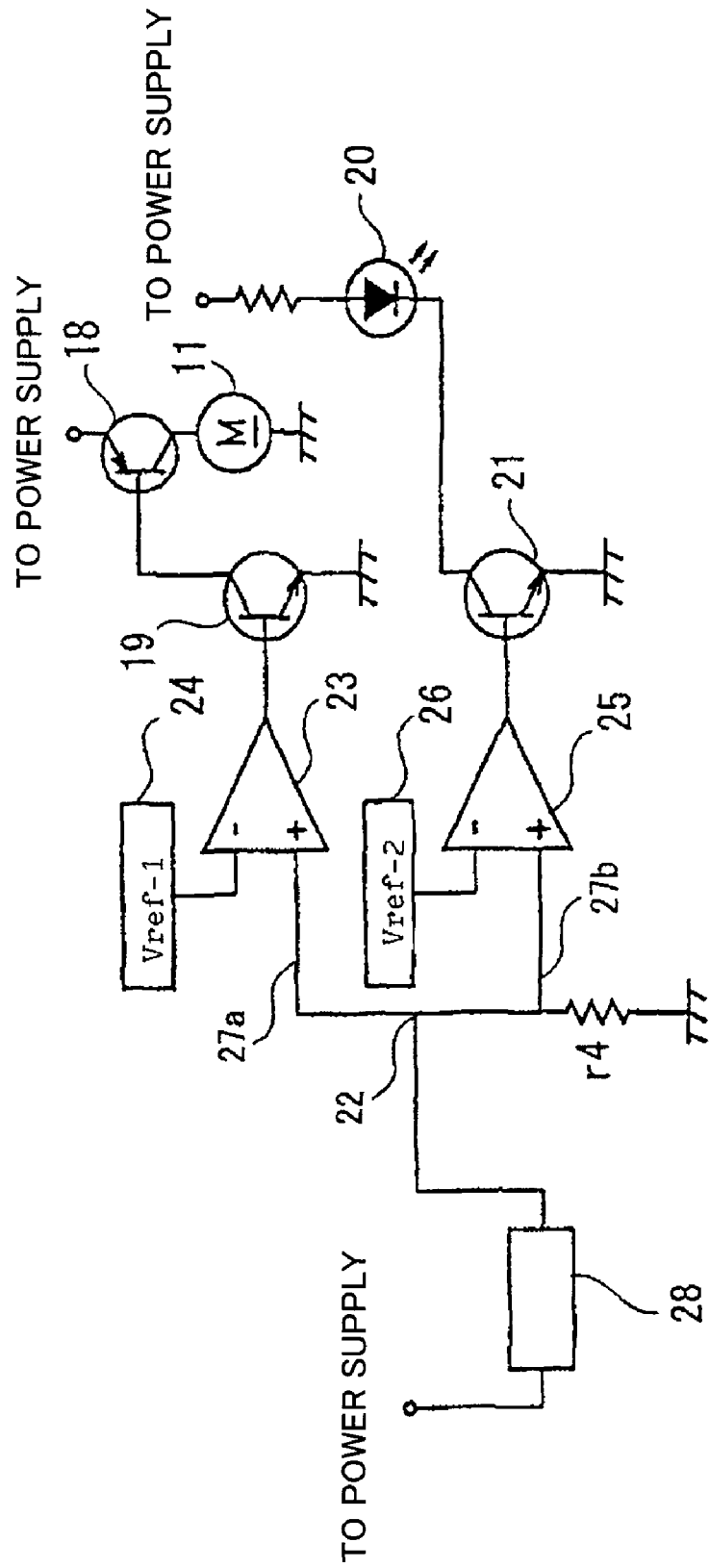

MASK DEVICE WITH BLOWER

RELATED APPLICATIONS

The present application is based on International Application Number PCT/JP2007/069175 filed Oct. 1, 2007, and claims priority from Japanese Application Number 2006-272994 filed Oct. 4, 2006, the disclosures of which are hereby incorporated by reference herein in their entirety.

TECHNICAL FIELD

The present invention relates to a mask device with blower that is suitable for a whole surface mask, a half surface mask, and the like used for the purpose of dust prevention and gas protection.

BACKGROUND ART

A mask device with blower according to the conventional technology has a blower attached to a front side or a rear side of a filtering material on a ventilation passage and helps breathing using an air supply force (inhalation force) of the blower. The blower is generally classified into a type (referred to as constant flow rate blower) where air is supplied at a steady flow regardless of breathing of a person who wears the mask device and a type (referred to as breathing dependant blower) where air supply is made following breathing of the person who wears the mask device.

An example of a mask device (breathing device) that includes a breathing dependant blower is disclosed in Japanese Patent No. 3,726,886 (Patent Document 1). In this mask device, an anterior portion of a face body is provided with an exhaust valve that is opened at the time of exhausting air and closed at the time of inhaling air, and an inhalation valve that is closed at the time of exhausting air and opened at the time of inhaling air. Furthermore, a motor driven blower that supplies external air to the face body through the inhalation valve during a normal operation is disposed. In the vicinity of the exhaust valve or the inhalation valve, a sensor composed of a photo interrupter is disposed, which detects a position of the exhaust valve or the inhalation valve and outputs a signal at the time of exhausting air or inhaling air. In addition, in accordance with the signal that is output from the sensor, power is supplied to the motor to normally operate the motor at the time of inhaling air, and power supply to the motor is stopped or reduced at the time of exhausting air.

The mask device with blower has an advantage that the person who wears the mask device comfortably inhales air as a first characteristic and a face body internal pressure becomes higher than an outer atmospheric pressure (becomes a positive pressure) as a second characteristic, and the mask device with blower can suppress harmful dust or harmful gas from being infiltrated due to a gap between a mask and a skin of the person who wears the mask device. In particular, the second characteristic is important. Accordingly, the mask device with blower is widely used for work for removing asbestos that has bad influence on the health of a human body even if an extremely small amount of harmful dust or harmful air is infiltrated into the human body and work in an environment where radioactive dust is provided (for example, in a nuclear power plant).

The mask device with blower has a disadvantage in that although air supply is sufficiently made when a filter is a new product, but the amount of air supply may be reduced due to dust clogging in a filtering material or a reduction in battery voltage. That is, if the mask device is continuously used, the amount of air supply is reduced, and the face body internal pressure cannot be maintained at a positive pressure. As a result, a harmful material may not be prevented from being infiltrated. Accordingly, if a positive pressure state in the face body can be easily recognized by a person who wears the mask device, a filter or a battery can be replaced immediately before or immediately after it turns a negative pressure, which results in continuously preventing the harmful material from being infiltrated.

The conventional technologies of detecting a face body internal pressure in a mask device are disclosed in Japanese Unexamined Patent Publication Nos. 10-28744 (Patent Document 2) and 60-68869 (Patent Document 3), and Japanese Unexamined Utility Model Publication Nos. 61-118618 (Patent Document 4) and 60-49851 (Patent Document 5).

The conventional technologies for detecting a face body internal pressure that are disclosed in Patent Documents 2 to 5 detect the face body internal pressure using a material that easily responds to a pressure of a diaphragm or the like. However, in order to allow the face body internal pressure to be detected even at a positive pressure of several Pascal, it is needed to make a corresponding pressure response more responsive. Since the diaphragm is very weak and may be easily deformed or destroyed, a failure or a setting deviation may be easily generated.

Meanwhile, a position (shape) of each valve in the face body is determined depending on a state of the face body internal pressure. Accordingly, by knowing the position (shape) of the valve, a positive pressure state of the face body internal pressure can also be recognized.

DISCLOSURE OF THE INVENTION

Accordingly, it is an object of the present invention to provide a mask device with blower in which a sensor for warning (for example, photo interrupter) that detects a position of a valve in a non-contact state and outputs a signal is disposed in the vicinity of an exhaust valve in a mask, a positive pressure state of a face body internal pressure is recognized based on a signal output from the sensor, and a warning device that gives a warning using light, a sound, and a vibration is operated or stopped through a control circuit when the positive pressure of the face body internal pressure is lower than a predetermined positive pressure, thereby informing a person who wears the mask device of the positive pressure of the face body internal pressure being lower than the predetermined positive pressure.

In Patent Document 1 described above, the sensor, such as the photo interrupter, is disposed in the vicinity of the valve in the mask, and detects a breathing change in the breathing dependant blower. Since the sensor is only for blower control, the following problems occur, when the sensor is used for positive pressure detection as it is.

In general, the blower increases an air supply amount by increasing the number of rotations of a fan. However, in a portable small blower that is used in a breathing dependant blower, an increase speed of the air supply amount is late, and an air supply amount cannot follow an air inhalation increase speed of a person who wears the mask device. In case where an object to be detected is an exhaust valve in the detection system that is disclosed in Patent Document 1, it is necessary to set the sensor such that air supply is made earlier than the point of time a breathing state of the person who wears the mask device is changed from an air exhaust state to an air inhalation state and the exhaust valve is closed, taking an account of delay in air supply. For this reason, a setting distance that the sensor reacts is set to a position that is sufficiently spaced apart from a position where the exhaust valve is closed (state where the exhaust valve is greatly opened). However, in a warning device that generates light, a sound, and a vibration, since a delay due to a response is not generated, the setting distance that the sensor reacts may be approximately set to the position where the exhaust valve is closed. For this reason, when the sensor setting value disclosed in Patent Document 1 is used as it is, the warning device may operate even at a significantly high positive pressure.

A mask device with blower according to the present invention includes an exhaust valve that is provided on an anterior portion of a face body, and moves in an opening direction at the time of exhausting air and in a closing direction at the time of inhaling air; an inhalation valve that is provided on the anterior portion of the face body, and moves in a closing direction at the time of exhausting air and in an opening direction at the time of inhaling air; a blower that is driven by a motor, and supplies external air to an inner portion of the face body through the inhalation valve when the blower operates; and a sensor for blower control that is disposed in the vicinity of the exhaust valve, and detects a movement position of the exhaust valve at the time of inhaling air in a non-contact state with respect to the exhaust valve and generates a signal. When a person who wears the mask device inhales air, power is supplied to the motor to operate the blower, and when the person exhausts air, power supply to the motor is stopped or reduced, based on the signal that is output from the sensor for blower control. The mask device with blower further includes a sensor for warning that detects a position of the exhaust valve which is caused to move when an internal pressure of the face body is lower than an outer atmospheric pressure in a non-contact state with respect to the exhaust valve and outputs a signal, at the time of inhaling air; and a control circuit that receives the signal output from the sensor for warning and operates a warning device. Each of the sensor for blower control and the sensor for warning is composed of a non-contact sensor that monitors a state of the exhaust valve.

The mask device with blower is provided with a sensor for warning which detects a position of an exhaust valve which is caused to move when an internal pressure of a face body is lower than an outer atmospheric pressure at the time of inhaling air in a non-contact state with respect to the exhaust valve and outputs a signal, and the warning device operates in accordance with a signal that is output from the sensor for warning. When the air supply amount by the blower is reduced due to dust clogging in a filtering material or the reduction in battery voltage, a person who wears the mask device can easily recognize when the face body internal pressure is lowered by the operation of the warning device. Accordingly, the person who wears the mask device replaces a filter or a battery, thereby continuously preventing a harmful material from being infiltrated. Furthermore, since a diaphragm that is very weak and easily deformed and destroyed is not used, a failure is rarely generated and a setting value for determining a movement position of the valve, which has an effect on the operation of the warning device, does not easily deviate.

The mask device with blower can take the following forms.

The sensor for blower control serves as the sensor for warning, and a first movement position and a second movement position that is closer to the closing direction than the first movement position are set as the movement position of the exhaust valve with respect to the sensor for blower control at the time of inhaling air. In addition, the control circuit includes a first comparator that compares a signal output of the sensor for blower control and a first reference output corresponding to the first movement position, and outputs a signal when the signal output of the sensor for blower control exceeds the first reference output, such that power is supplied to the motor, and a second comparator that compares the signal output of the sensor for blower control and a second reference output corresponding to the second movement position, and outputs a signal when the signal output of the sensor for blower control exceeds the second reference output, such that the warning device operates. According to the mask device with blower that has the above configuration, one position detecting sensor can function as a sensor for blower control and also as a sensor for warning.

The non-contact sensor is composed of a photo interrupter that includes a light emitting element and a light receiving element, light that is emitted from the light emitting element is reflected by the exhaust valve and received by the light receiving element, and the light receiving element detects the amount of received light and outputs a signal.

The exhaust valve is formed of a material in which a magnetic body is mixed, and the non-contact sensor is composed of a magnetic resistance effect element that increases a resistance following on the strength of a detected magnetism.

BRIEF DESCRIPTION OF THE DRAWINGS

FIG. 1 is a cross-sectional view illustrating a mask device with blower according to a first embodiment of the present invention.

FIG. 2 is a cross-sectional view illustrating the vicinity of an exhaust valve in the mask device shown in FIG. 1, which shows a state of when a person who wears the mask device exhausts air.

FIG. 3 is a cross-sectional view illustrating the vicinity of an exhaust valve in the mask device shown in FIG. 1, which shows a state of when a person who wears the mask device inhales air after exhausting air.

FIG. 4 is a cross-sectional view illustrating the vicinity of an exhaust valve in the mask device shown in FIG. 1, which shows a state of when a person who wears the mask device inhales air, but an air blasting volume by a blower does not satisfy an air inhalation amount of the person who wears the mask device.

FIG. 5 is a circuit diagram illustrating a portion of a control circuit for blower driving control and warning device operation in the mask device shown in FIG. 1.

FIG. 6 is a cross-sectional view of the vicinity of an exhaust valve showing another arrangement example of position detecting sensors for blower control and warning in the mask device shown in FIG. 1.

FIG. 7 is a circuit diagram illustrating a portion of a control circuit for blower driving control and warning device operation in a mask device with blower according to a second embodiment of the present invention.

FIG. 8 is a cross-sectional view illustrating the vicinity of an exhaust valve in a mask device with blower according to the second embodiment of the present invention, which shows a state of when a person who wears the mask device exhausts air.

FIG. 9 is a cross-sectional view of the vicinity of an exhaust valve in a mask device with blower according to a third embodiment of the present invention, which shows a state of when a person who wears the mask device exhausts air.

FIG. 10 is a circuit diagram illustrating a portion of a control circuit for blower driving control and warning device operation in a mask device with blower according to a fourth embodiment of the present invention.

BEST MODE FOR CARRYING OUT THE INVENTION

A mask device with blower according to a first embodiment of the present invention will be described with reference to FIGS. 1 to 6.

As shown in FIG. 1, a mask device with blower 1 includes an exhaust slot 4 and an inhalation slot 6 that are provided at an anterior portion of a face body 2. The exhaust slot 4 has an external surface that is covered with an exhaust valve cover 3, and the inhalation slot 6 has an external surface that is covered with a filtering material cover 5, similar to the exhaust slot.

The exhaust slot 4 is provided with an exhaust valve 7 that moves in an opening direction when a person who wears the mask device exhausts air and moves in a closing direction when the person inhales air, in accordance with breathing of the person. The inhalation slot 6 is provided with an inhalation valve 8 that is closed when the person exhausts air and opened when the person inhales air. In the filtering material cover 5, a filtering material 9 is disposed at its front end (end of the filtering material cover at the side away from the inhalation valve 8), and a blower 10 is disposed between the filtering material 9 and the inhalation slot 6. The blower 10 includes a driving motor 11 and a bladed wheel 12 that is coupled to an output shaft of the driving motor 11, and supplies external air to an inner portion of the face body 2 through the filtering material 9 and the inhalation valve 8, when the motor 11 normally operates.

FIGS. 2 to 4 are cross-sectional views illustrating the vicinity of the exhaust valve 7 in the mask device with blower 1 according to this embodiment. FIG. 2 shows a position of the exhaust valve 7 when a person who wears the mask device exhausts air. FIG. 3 shows a position of the exhaust valve 7 in an initial air inhalation state where a person who wears the mask device inhales air after exhausting air. FIG. 4 shows a position of the exhaust valve 7 when a person who wears the mask device is in an air inhalation state, in the case where an air blasting volume by a blower does not satisfy an air inhalation amount of the person who wears the mask device. As shown in FIGS. 2 to 4, an air exhaust valve seat 13 is mounted around the exhaust slot 4 of the face body 2, and the exhaust valve 7 is attached to the air exhaust valve seat 13.

The mask device with blower 1 according to this embodiment uses two sensors that include a sensor for blower control and a sensor for warning. At the outside of the peripheral portion of the exhaust valve 7, a first position detecting sensor 14 and a second position detecting sensor 15 that detect a movement position of the exhaust valve 7 are disposed. Since the first position detecting sensor 14 and the second position detecting sensor 15 have the same configuration, only the configuration of the first position detecting sensor 14 is described below.

The first position detecting sensor 14 includes a reflective photo interrupter that is composed of a light emitting element (light emitting diode) 14a and a light receiving element (transistor receiver) 14b, and outputs a signal when the light receiving element 14b detects infrared rays output from the light emitting element 14a. Furthermore, the position detecting sensor 14 (reflective photo interrupter) is constructed such that a light emitting surface of the light emitting element 14a and a light receiving surface of the light receiving element 14b are disposed toward the exhaust valve 7. Similarly, the second position detecting sensor 15 (reflective photo interrupter) is also constructed such that a light emitting surface of a light emitting element 15a and a light receiving surface of a light receiving element 15b are disposed toward the exhaust valve 7.

The first position detecting sensor 14 is used for blower control to follow breathing, and the second position detecting sensor 15 is used for warning to operate the warning device.

If the exhaust valve 7 moves in a direction that is away from the first position detecting sensor 14 beyond a position of a boundary line d1 that is set for the first position detecting sensor 14, the light receiving element 14b of the position detecting sensor 14 is switched into an off state from an on state. Similarly, if the exhaust valve 7 moves in a direction that is away from the second position detecting sensor 15 beyond a position of a boundary line d2 that is set for the second position detecting sensor 15, the light receiving element 15b of the second position detecting sensor 15 is switched into an off state from an on state.

Specifically, if the exhaust valve 7 is positioned closer to the first position detecting sensor 14 than the position of the boundary line d1 shown in FIGS. 2 to 4, infrared rays that are output from the light receiving element 14a of the first position detecting sensor 14 are reflected on the exhaust valve 7 and received by the light receiving element 14b. As a result, the light receiving element 14b is turned on. In contrast, if the exhaust valve 7 is positioned farther to the first position detecting sensor 14 (to the side of the exhaust valve seat 13) than the position of the boundary line d1, the infrared rays that are output from the light receiving element 14a and reflected on the exhaust valve 7 are not received by the light receiving element 14b. As a result, the light receiving element 14b is turned off.

Meanwhile, if the exhaust valve 7 is positioned closer to the second position detecting sensor 15 than the position of the boundary line d2 shown in FIGS. 2 to 4, infrared rays that are output from the light receiving element 15a of the second position detecting sensor 15 are reflected on the exhaust valve 7 and received by the light receiving element 15b. As a result, the light receiving element 15b is turned on. In contrast, if the exhaust valve 7 is positioned farther to the second position detecting sensor 15 (to the side of the exhaust valve seat 13) than the position of the boundary line d2, the infrared rays that are output from the light receiving element 15a and reflected on the exhaust valve 7 are not received by the light receiving element 15b. As a result, the light receiving element 15b is turned off.

Furthermore, as shown in FIGS. 2 to 4, the position of the boundary line d2 that is set for the second position detecting sensor 15 where the exhaust valve 7 moves and the light receiving element 15b is switched into an off state from an on state is set to be closer to the exhaust valve seat 13 than the position of the boundary line d1 that is set for the first position detecting sensor 14 where the exhaust valve 7 moves and the light receiving element 14b is switched into an off state from an on state.

In FIG. 2, arrowed chain lines that are shown by reference numeral 16 indicate passages of air exhausted from a person who wears the mask device at the time of exhausting air. Furthermore, in FIG. 3, arrowed chain lines that are shown by reference numeral 17 indicate passages of extra air blasting by the blower 10 that exceeds an air inhalation amount of the person who wears the mask device.

FIG. 5 is a circuit diagram illustrating a portion of a control circuit in the mask device with blower 1 according to a first embodiment. A first transistor (PNP type) 18 that controls power supply to the motor 11 driving the blower 10 has an emitter that is connected to a power supply and a collector that is connected to the motor 11. Furthermore, a base of the first transistor 18 is connected to a collector of a second transistor (NPN type) 19 that controls an operation of the first transistor 18. The second transistor 19 has an emitter that is connected to a ground (reference potential point) and a base that is connected to the power supply through a resistor r1 and connected to one end of the light receiving element 14b of the first position detecting sensor 14. Meanwhile, the other end of the light receiving element 14b of the first position detecting sensor 14 is connected to a ground (reference potential point).

Furthermore, in this embodiment, as one aspect of the warning device, an LED (warning LED 20) is used. One end of the warning LED 20 is connected to the power supply through a resistor, and the other end thereof is connected to a collector of a third transistor (NPN type) 21 that controls an on/off operation of the warning LED 20. The third transistor 21 has an emitter that is connected to a ground (reference potential point) and a base that is connected to the power supply through a resistor r2 and connected to one end of the light receiving element 15b of the second position detecting sensor 15. Meanwhile, the other end of the light receiving element 15b of the second position detecting sensor 15 is connected to a ground (reference potential point).

Next, a function of the mask device with blower 1 according to the first embodiment will be described. At the time of exhausting air, as shown in FIG. 2, due to air exhausted from the person who wears the mask device, the exhaust valve 7 is lifted to the first and second position detecting sensors 14 and 15 from the exhaust valve seat 13. That is, a face body internal pressure is a positive pressure (pressure that is higher than an outer atmospheric pressure), and the exhaust valve 7 is positioned closer to the first and second position detecting sensors 14 and 15 than the positions of the boundary lines d1 and d2. For this reason, the infrared rays that are output from the light emitting element 14a of the first position detecting sensor 14 and reflected on the exhaust valve 7 are received by the light receiving element 14b. As a result, the light receiving element 14b is turned on (outputs a signal). Similarly, the infrared rays that are output from the light emitting element 15a of the second position detecting sensor 15 and reflected on the exhaust valve 7 are received by the light receiving element 15b. As a result, the light receiving element 15b is turned on (outputs a signal).

In FIG. 5, if the light receiving element 14b of the first position detecting sensor 14 is turned on, a voltage that is applied to the base of the second transistor 19 becomes approximately a ground level. For this reason, the second transistor 19 is turned off. As a result, the first transistor 18 is also turned off. Accordingly, power is not supplied to the motor 11 and the blower 10 stops air blasting.

Furthermore, if the light receiving element 15b of the second position detecting sensor 15 is turned on, a voltage that is applied to the base of the third transistor 21 becomes approximately a ground level. For this reason, the third transistor 21 is turned off. As a result, power is not supplied to the warning LED 20 and the warning LED 20 is turned off.

When the person who wears the mask device inhales air after exhausting air, as shown in FIG. 3, the exhaust valve 7 moves toward the exhaust valve seat 13, because a valve lifting pressure decreases as air exhausted from the person who wears the mask device decreases. The moving exhaust valve 7 first passes the position of the boundary line d1 that is set for the first position detecting sensor 14. In this case, the infrared rays that are irradiated from the light emitting element 14a of the first position detecting sensor 14 and reflected on the exhaust valve 7 deviate from the light receiving surface of the light receiving element 14b, and a signal is not output. As a result, the light receiving element 14b is turned off.

If the light receiving element 14b of the first position detecting sensor 14 is turned off, in the control circuit shown in FIG. 5, a base current flows to the base of the second transistor 19 through the resistor r1. Accordingly, the second transistor 19 is turned on. As a result, the base current flows from the emitter of the first transistor 18 to the base, and the first transistor 18 is also turned on. Accordingly, power is supplied to the motor 11 through the first transistor 18 and the blower 10 operates. That is, a signal that is output from the first position detecting sensor 14 becomes an off state (by a position detection signal at the position of the boundary line d1). As a result, the blower 10 operates.

When clogging of the filtering material 9 is not generated or a power supply voltage is not reduced, before the exhaust valve 7 reaches the position of the boundary line d2 that is set for the second position detecting sensor 15, the air supply amount of the blower 10 exceeds the air inhalation amount of the person who wears the mask device, the face body internal pressure is maintained at a positive pressure, and extra air blasting (refer to reference numeral 17 in FIG. 3) by the blower is output from the exhaust slot 4 of the exhaust valve seat 13. For this reason, as shown in FIG. 3, the exhaust valve 7 is slightly floated on the exhaust valve seat 13, and the exhaust valve 7 does not reach the position of the boundary line d2 that is set for the second position detecting sensor 15. Accordingly, in the second position detecting sensor 15, the infrared rays that are output from the light emitting element 15a and reflected on the exhaust valve 7 are received by the light receiving element 15b. As a result, the light receiving element 15b maintains an on state (outputs a signal). Accordingly, since the light receiving element 15b of the second position detecting sensor 15 maintains an on state, the third transistor 21 maintains an off state, power is not supplied to the warning LED 20, and the warning device does not operate (warning LED 20 is turned off).

When the person inhales air after exhausting air, on the other hand, if the clogging of the filtering material 9 is generated or the power supply voltage is reduced, the air supply amount of the blower 10 does not satisfy the air inhalation amount of the person who wears the mask device. As a result, the face body internal pressure becomes a negative pressure (a state where an internal pressure of the face body 2 is lower than the outer atmospheric pressure), and air blasting strong enough to lift the exhaust valve 7 disappears. For this reason, as shown in FIG. 4, the exhaust valve 7 moves to the exhaust valve seat 13 and closely adheres to the exhaust valve seat 13. Accordingly, since the exhaust valve 7 is beyond the position of the boundary line d2 that is set for the second position detecting sensor 15, the infrared rays that are irradiated from the light emitting element 15a of the second position detecting sensor 15 and reflected on the exhaust valve 7 deviate from the light receiving surface of the light receiving element 15b, and a signal is not output (light receiving element 15b is turned off).

In FIG. 5, if the light receiving element 15b of the second position detecting sensor 15 is turned off, the third transistor 21 is turned on, because a base current flows to the base of the third transistor 21 through the resistor r2. As a result, power is supplied to the warning LED 20 and the warning LED 20 is turned on. Accordingly, a signal that is output from the second position detecting sensor 15 becomes an off state (by a position detection signal at the position of the boundary line d2), thereby allowing the warning LED 20 to inform the person who wears the mask device of the face body internal pressure becoming a negative pressure through turning on.

In the above-described first embodiment, the first position detecting sensor 14 and the second position detecting sensor 15 are disposed in front of the exhaust valve 7 in the moving direction thereof (in the direction where the exhaust valve moves away from the exhaust valve seat 13 and is opened), but the positions of the first and second position detecting sensors 14 and 15 are not limited to the front of the exhaust valve 7 in the movement direction thereof. For example, as shown in FIG. 6, the first and second position detecting sensors 14 and 15 may be laterally disposed with respect to the movement direction of the exhaust valve 7, so as to detect a lateral end of the exhaust valve 7. Furthermore, the first and second position detecting sensors 14 and 15 are not limited to photo interrupters. If each of the first and second position detecting sensors 14 and 15 is a non-contact sensor that can detect the position of the exhaust valve 7 in a non-contact state, the same effect can be anticipated.

Next, a mask device with blower according to a second embodiment of the present invention will be described with reference to FIGS. 7 and 8.

In the previously described first embodiment, the position detecting sensor 14 for blower control to follow breathing and the position detecting sensor 15 for warning to operate the warning device are individually provided with respect to the movement position of the exhaust valve 7. However, in the second embodiment, one position detecting sensor is provided with respect to the movement position of the exhaust valve 7 such that the position detecting sensor individually controls the blower 10 and the warning device (warning LED 20) in the control circuit.

FIG. 7 is a circuit diagram illustrating a portion of a control circuit that individually controls the blower 10 and the warning device. In this embodiment, similarly to the first embodiment, an LED (warning LED 20) is used as the warning device, and a position detecting sensor 14 (composed of a photo interrupter) that detects the movement position of the exhaust valve 7 is disposed at the outside of the vicinity of the exhaust valve 7. As shown in FIG. 7, one end of the light receiving element 14b of the position detecting sensor 14 is connected to a power supply through a resistor r3, and the other end thereof is connected to a ground (reference potential point).

One end of a resistor r4 is connected to a connection point 22 between one end of a light receiving element 14b of the position detecting sensor 14 and the resistor r3. The other end of the resistor r4 is connected to a ground (reference potential point). Furthermore, a signal line from the light receiving element 14b of the position detecting sensor 14 is bifurcated at a position passing the connection point 22, and one bifurcated signal line 27a is connected to a plus input terminal of a first comparator 23, and the other bifurcated signal line 27b is connected to a plus input terminal of a second comparator 25.

A first reference output 24 (Vref-1) that outputs a predetermined level signal is connected to a minus input terminal of the first comparator 23. An output terminal of the first comparator 23 is connected to a base of a second transistor (NPN type) 19 that controls an operation of the first transistor 18. The first comparator 23 outputs a signal, when an output of the light receiving element 14b of the position detecting sensor 14 exceeds the first reference output 24 (Vref-1).

A second reference output 26 (Vref-2) that outputs a predetermined level signal is connected to a minus input terminal of the second comparator 25. Furthermore, an output terminal of the second comparator 25 is connected to a base of a third transistor (NPN type) 21. The second comparator 25 outputs a signal, when an output of the light receiving element 14b of the position detecting sensor 14 exceeds the second reference output 26 (Vref-2).

FIG. 8 is a cross-sectional view illustrating the vicinity of the exhaust valve 7 in the mask device with blower 1 according to the second embodiment.

Reference numeral d1 that is shown in FIG. 8 indicates a boundary line position (corresponding to a first movement position) of the exhaust valve 7 (detection object) to detect a position for blower control that is set for the position detecting sensor 14, and reference numeral d2 indicates a boundary line position (corresponding to a second movement position) of the exhaust valve 7 (detection object) to detect a position for warning that is set for the position detecting sensor 14. When the exhaust valve 7 moves to approach the position detecting sensor 14 beyond the boundary line d2 (to go away from the exhaust valve seat 13), infrared rays that are output from the light emitting element 14a of the position detecting sensor 14 are reflected on the exhaust valve 7 and received by the light receiving element 14b. As a result, the light receiving-element 14b is turned on.

A potential of the first reference output 24 (Vref-1) in the circuit shown in FIG. 7 is set to be equal to or slightly lower than a potential of the connection point 22 that is associated with an output of the light receiving element 14b of the position detecting sensor 14 when the exhaust valve 7 is located at the position of the boundary line d1 shown in FIG. 8. Furthermore, a potential of the second reference output 26 (Vref-2) is set to be equal to or slightly lower than a potential of the connection point 22 that is associated with an output of the light receiving element 14b of the position detecting sensor 14 when the exhaust valve 7 is located at the position of the boundary line d2 shown in FIG. 8.

The function of the second embodiment will be described. When the exhaust valve 7 is located at the position (in a state where the person who wears the mask device exhausts air) shown in FIG. 8, an output of the light receiving element 14b of the position detecting sensor 14 becomes an on state. In the control circuit shown in FIG. 7, if the light receiving element 14b of the position detecting sensor 14 is turned on, a current that flows from the power supply through the resistor r3 flows to a ground (reference potential point) through the light receiving element 14b. For this reason, inputs of the plus input terminals of the first comparator 23 and the second comparator 25 that are at the same potential as that of the connection point 22 become a ground level. Accordingly, outputs of the first comparator 23 and the second comparator 25 also become an off state, and the second transistor 19 is turned off. As a result, the first transistor 18 is also turned off, the third transistor 21 is turned off, the motor 11 is in a stop state (that is, the blower 10 stops air supply), and the warning LED 20 is turned off.

Next, if the exhaust valve 7 moves to the exhaust valve seat 13 as the person who wears the mask device inhales air after exhausting air, passes the position shown by the boundary line d1 in FIG. 8, and slightly moves to the exhaust valve seat 13 by air inhalation, then the light receiving amount of the light receiving element 14b decreases, and a current that flows to the light receiving element 14b through the resistor r3 shown in FIG. 7 decreases. For this reason, the current that flows through the resistor r3 flows to a ground (reference potential point) through the resistor r4. As a result, the potential of the connection point 22 increases from a ground level as the light receiving amount of the light receiving element 14b decreases. The voltage of the plus input terminal of the first comparator 23 that is at the same potential as that of the connection point 22 exceeds the first reference output 24 (Vref-1).

Accordingly, the output of the first comparator 23 becomes an on state, and the second transistor 19 is turned on. As a result, the first transistor 18 is turned on, power is supplied to the motor 11, the blower 10 operates, and air supply is made. Meanwhile, in the second comparator 25, the voltage of the plus input terminal that is at the same potential as that of the connection point 22 does not reach the second reference output 26 (Vref-2). As a result, the output of the second comparator 25 is maintained in an off state. For this reason, the third transistor 21 is turned off, and the warning LED 20 is turned off.

When the clogging of the filtering material 9 is not generated or the power supply voltage is not reduced, as shown in FIG. 3, before the exhaust valve 7 reaches the position of the boundary line d2, the air supply amount of the blower 10 exceeds the air inhalation amount of the person who wears the mask device, the face body internal pressure is maintained at a positive pressure, and the extra air blasting (refer to reference numeral 17 in FIG. 3) by the blower flows out of the exhaust slot 4 of the exhaust valve seat 13. For this reason, as shown in FIG. 3, the exhaust valve 7 is slightly floated on the exhaust valve seat 13, and the exhaust valve 7 does not reach the position of the boundary line d2 that is set for the position detecting sensor 14.

Accordingly, in the position detecting sensor 14, the infrared rays that are output from the light emitting element 14a and reflected on the exhaust valve 7 are still received by the light receiving element 14b, and thus the light receiving element 14b maintains an on state (outputs a signal). As a result, since the voltage of the plus input terminal of a second comparator 25 that is at the same potential as that of the connection point 22 does not reach the second reference output 26 (Vref-2), the output of the second comparator 25 is maintained in an off state. Accordingly, the third transistor 21 is maintained in an off state. As a result, power is not supplied to the warning LED 20, and the warning device does not operate (warning LED 20 is turned off).

Meanwhile, if the clogging of the filtering material 9 is generated or the power supply voltage is reduced, the air supply amount of the blower 10 does not satisfy the air inhalation amount of the person who wears the mask device. As a result, the face body internal pressure becomes a negative pressure (a state where an internal pressure of the face body 2 is lower than the outer atmospheric pressure), and air blasting that lifts the exhaust valve 7 is removed. For this reason, as shown in FIG. 4, the exhaust valve 7 moves toward the exhaust valve seat 13, and passes the position of the boundary line d2 that is set for the position detecting sensor 14. Finally, the exhaust valve 7 closely adheres to the exhaust valve seat 13. As a result, since the infrared rays that are irradiated from the light emitting element 14a of the position detecting sensor 14 and reflected on the exhaust valve 7 may deviate from the light receiving surface of the light receiving element 14b, a signal is not output from the light receiving element 14b (light receiving element 14b is turned off).

As the light receiving element 14b of the position detecting sensor 14 is turned off, the current that flows through the resistor r3 flows to a ground (reference potential point) through the resistor r4, as shown in FIG. 7. As a result, the potential of the connection point 22 increases by the amount of current that flows through the resistor r4 with respect to a ground level, and the voltage of the plus input terminal of the second comparator 25 that is at the same potential as that of the connection point 22 exceeds the second reference output 26 (Vref-2). Accordingly, the output of the second comparator 25 becomes an on state, the third transistor 21 is turned on, and the warning LED 20 is turned on, thereby informing the person who wears the mask device of the face body internal pressure becoming a negative pressure.

As described above, although only one position detecting sensor (photo interrupter) is used in the case of this embodiment, the same effect as the first embodiment can be obtained.

In the above-described embodiment, as the warning device, for example, the LED that gives a warning using light is used, but the present invention is not limited thereto. The warning device may emit a sound or a vibration, thereby informing a warning. Furthermore, a combination of at least two of the light, the sound, and the vibration may be used.

In the above-described embodiment, power is supplied to the motor 11 in accordance with a signal from the position detecting sensor 14 so as to normally operate the motor 11 at the time of inhaling air, and power supply to the motor 11 is stopped at the time of exhausting air. However, power may be supplied to the motor 11 to normally operate the motor 11 at the time of inhaling air, and the power supplied to the motor 11 may be reduced at the time of exhausting air.

Next, a mask device with blower according to a third embodiment of the present invention will be described with reference to FIG. 9.

FIG. 9 is a cross-sectional view illustrating the vicinity of an exhaust valve in a mask device with blower according to this embodiment (a state where a person who wears the mask device exhausts air). In the present invention, since the position (shape) of the exhaust valve 7 may be recognized in a non-contact state, the exhaust valve 30 to be detected is formed of a material (silicon rubber) in which a magnetic body is mixed. In addition, each of the sensor 28 for blower control and the sensor 29 for warning is composed of a magnetic resistance effect element (hereinafter, referred to as an MR sensor) that increases its resistance depending on the strength of the detected magnetism, instead of the photo interrupter. By this configuration, even though the position (shape) of the valve is recognized using the MR sensor, the same effect as that of the first and second embodiments using the photo interrupter can be obtained.

Next, a mask device with blower according to a fourth embodiment of the present invention will be described with reference to FIG. 10.

FIG. 10 is a circuit diagram illustrating a portion of a control circuit in a mask device with blower according to this embodiment (a case where a blower and a warning device are individually controlled by a signal of one MR sensor). In this embodiment, only one MR sensor (MR sensor 28) is used with respect to the movement position of the exhaust valve 30 such that the MR sensor individually controls the blower 10 and the warning device (warning LED 20) in the control circuit.

As shown in FIG. 10, one end of the MR sensor 28 is directly connected to a power supply, and the other end thereof is connected to one end of the resistor r4. The other end of the resistor r4 is connected to a ground (reference potential point). Furthermore, a signal line that is connected to the other end of the MR sensor 28 is bifurcated at the connection point 22, and one bifurcated signal line 27a is connected to the plus input terminal of a first comparator 23, and the other bifurcated signal line 27b is connected to the plus input terminal of a second comparator 25. The first reference output 24 (Vref-1) that outputs a predetermined level signal is connected to the minus input terminal of the first comparator 23. Furthermore, the second reference output 26 (Vref-2) that outputs a predetermined level signal is connected to the minus input terminal of the second comparator 25.

Furthermore, a potential of the first reference output (Vref-1) is set to be equal to or slightly lower than a potential of the connection point 22 that is associated with a voltage drop due to a resistance of the MR sensor 28 when the exhaust valve 7 is present at the position of the boundary line d1 shown in FIG. 8. Furthermore, a potential of the second reference output 26 (Vref-2) is set to be equal to or slightly lower than a potential of the connection point 22 that is associated with a voltage drop due to a resistance of the MR sensor 28 when the exhaust valve 7 is present at the position of the boundary line d2 shown in FIG. 8. Since the other circuit configuration is the same as the configuration of the second embodiment shown in FIG. 7, the same components are denoted by the same reference numerals and the detailed description thereof is not given.

The function of the fourth embodiment will be described. When the exhaust valve 30 is located at the position (in a state where a person who wears the mask device exhausts air) shown in FIG. 9, the exhaust valve 30 in which the magnetic body is mixed is positioned closest to the MR sensor 28, as a result, a resistance of the MR sensor 28 that increases its resistance depending on the strength of the detected magnetism is maximized. For this reason, the amount of current that flows to a ground (reference potential point) through the MR sensor 28 and the resistor r4 becomes a minimum value, and a potential (voltage drop due to the resistor r4) of the connection point 22 with respect to a ground level (0 V) is minimized. The input voltage of the plus input terminal of the first comparator 23 that is at the same potential as that of the connection point 22 does not exceed the first reference output 24 (Vref-1). Similarly, the input voltage of the plus input terminal of the second comparator 25 that is at the same potential as that of the connection point 22 does not exceed the second reference output 26 (Vref-2).

Accordingly, the outputs of the first comparator 23 and the second comparator 25 become an off state, and the second transistor 19 is turned off and the third transistor 21 is turned off. As a result, the first transistor 18 is turned off, the motor 11 is stopped, the blower 10 stops air supply, and the warning LED 20 is turned off.

Next, if the exhaust valve 30 moves toward the exhaust valve seat 13 as the person who wears the mask device inhales air after exhausting air, in accordance with the movement of the exhaust valve 30, a magnetism that is detected by the MR sensor 28 becomes weaker (a flux density decreases). As a result, a resistance of the MR sensor 28 varies to be decreased. For this reason, a current that flows to a ground (reference potential point) through the MR sensor 28 and the resistor r4 increases from the minimum value, and the potential (voltage drop due to the resistor r4) of the connection point 22 with respect to a ground level (0 V) increases from the lowest potential (potential varies to be increased).

If the exhaust valve 30 passes the position of the boundary line d1 shown in FIG. 9 and slightly moves to the exhaust valve seat 13 by air inhalation, the potential (that is, input voltage of the plus input terminal of the first comparator 23) of the connection point 22 caused by the resistance of the MR sensor 28 exceeds the potential of the first reference output 24 (Vref-1).

Accordingly, the output of the first comparator 23 becomes an on state, and the second transistor 19 is turned on. As a result, the first transistor 18 is turned on, power is supplied to the motor 11, and the blower 10 operates to supply air.

Meanwhile, a voltage of the plus input terminal of the second comparator 25 (which is the same potential as that of the connection point 22 caused by a resistance of the MR sensor 28) does not reach the second reference output 26 (Vref-2). As a result, the output of the second comparator 25 is maintained in an off state. Accordingly, the third transistor 21 is turned off, and the warning LED 20 is turned off.

When clogging of the filtering material 9 is not generated or a power supply voltage is not reduced, before the exhaust valve 7 reaches the position of the boundary line d2, the air supply amount of the blower 10 exceeds the air inhalation amount of the person who wears the mask device, the face body internal pressure is maintained at a positive pressure, and the extra air blasting (refer to reference numeral 17 in FIG. 3) by the blower flows out of the exhaust slot 4 of the exhaust valve seat 13. For this reason, the exhaust valve 30 is slightly floated on the exhaust valve seat 13, and the exhaust valve 30 does not reach the position of the set boundary line d2.

Accordingly, the resistance of the MR sensor 28 is maintained at a value that allows the output of the first comparator 23 to become an on state and the output of the second comparator 25 to become an off state at the same time. Accordingly, the third transistor 21 is maintained in an off state, power is not supplied to the warning LED 20, and the warning device does not operate (warning LED 20 is turned off).

Meanwhile, if the clogging of the filtering material 9 is generated or the power supply voltage is reduced, the air supply amount of the blower 10 does not satisfy the air inhalation amount of the person who wears the mask device. As a result, the face body internal pressure becomes a negative pressure (a state where an internal pressure of the face body 2 is lower than the outer atmospheric pressure), and air blasting that lifts the exhaust valve 30 disappears. Accordingly, as shown in FIG. 4, the exhaust valve 30 moves toward the exhaust valve seat 13. As a result, the exhaust valve 30 passes the boundary line d2 that is set for the MR sensor 28.

Accordingly, since the exhaust valve 30 in which the magnetic body is mixed is positioned farthest from the MR sensor 28, the magnetism that is detected by the MR sensor 28 is minimized, and the resistance of the MR sensor 28 is minimized. For this reason, the current that flows to a ground (reference potential point) through the MR sensor 28 and the resistor r4 is maximized, and the potential (voltage drop due to the resistor r4) of the connection point 22 with respect to a ground level (0 V) is maximized. The voltage of the plus input terminal of the second comparator 25 that is at the same potential as the connection point 22 exceeds the second reference output 26 (Vref-2). Accordingly, the output of the second comparator 25 becomes an on state, the third transistor 21 is turned on, and the warning LED 20 is turned on, thereby informing the person who wears the mask device of the face body internal pressure becoming a negative pressure.

As described above, although the number of MR sensors to be used is only one, the same effect as in the case of the second embodiment can be obtained.

The invention claimed is:

1. A mask device with blower, comprising:
a face body;
an exhaust valve provided on the face body and movable in an opening direction with respect to a first valve seat upon exhausting air and in a closing direction with respect to the first valve seat upon inhaling air, the exhaust valve having first and second positions away from the first valve seat, the second position being between the first position and the first valve seat;
an inhalation valve provided on the face body and movable in a closing direction with respect to a second valve seat upon exhausting air and in an opening direction with respect to the second valve seat upon inhaling air;
a blower configured to be driven by a motor for supplying external air to an inside of the face body through the inhalation valve;

a control circuit;
a warning unit;
a first position sensor for blower control disposed in the vicinity of and in a non-contact state with respect to the exhaust valve for detecting a position of the exhaust valve; and
a second position sensor for warning disposed in a non-contact state with respect to the exhaust valve and configured to detect a position of the exhaust valve,
wherein
the first position sensor is configured to output a first signal to the control circuit to stop or reduce power supply to the motor for driving the blower when the first position sensor detects that the exhaust valve is away from the first valve seat beyond the first position,
the second position sensor is configured to output a second signal to the control circuit to stop operation of the warning unit that is connected to the control circuit when the second position sensor detects that the exhaust valve is away from the first valve seat beyond the second position,
the first position sensor is configured to output the first signal to the control circuit to enable power supply to the motor for driving the blower when the first position sensor detects that the exhaust valve is between the first position and the first valve seat, and
the second position sensor is configured to output the second signal to the control circuit to operate the warning unit when the second position sensor detects that the exhaust valve is between the second position and the first valve seat.

2. The mask device with blower according to claim 1, wherein each of said first position sensor and said second position sensor includes a photo interrupter that includes a light emitting element and a light receiving element,
the exhaust valve is configured to reflect light that is emitted from the light emitting element and to be received by the light receiving element, and
the light receiving element is configured to detect an amount of received light and output the respective first or second signal.

3. The mask device with blower according to claim 1, wherein
the exhaust valve is formed of a material in which a magnetic body is mixed, and
each of the first position sensor and the second position sensor includes a magnetic resistance effect element with a resistance variable depending on a strength of a detected magnetism.

4. The mask device with blower according to claim 1, wherein the first position sensor and the second position sensor are arranged in a lateral direction substantially perpendicular to a moving direction of the exhaust valve to detect a lateral end of the exhaust valve.

5. A mask device with blower, comprising:
a face body;
an exhaust valve provided on the face body and movable in an opening direction with respect to a first valve seat upon exhausting air and in a closing direction with respect to the first valve seat upon inhaling air;
an inhalation valve provided on the face body and movable in a closing direction with respect to a second valve seat upon exhausting air and in an opening direction with respect to the second valve seat upon inhaling air;
a blower configured to be driven by a motor for supplying external air to an inside of the face body through the inhalation valve;
a control circuit;
a position detecting sensor that is disposed in the vicinity of the exhaust valve for detecting a position of the exhaust valve, in a non-contact state with respect to the exhaust valve, and configured to output a signal to the control circuit for controlling the blower, the signal output by the position detecting sensor indicating the exhaust valve moving with respect to the first valve seat; and
a warning unit that is operable based on the signal output by the position detecting sensor,
wherein the control circuit comprises
a first comparator of which one input terminal is connected to a first reference output corresponding to a first signal which is the signal output by the position detecting sensor upon detecting the exhaust valve in a position open up to a first position away from the first valve seat; and
a second comparator of which one input terminal is connected to a second reference output corresponding to a second signal which is the signal output by the position detecting sensor upon detecting the exhaust valve in a position open up to a second position between the first valve seat and the first position; and
wherein
the first comparator is configured to output a signal for supplying power to the motor, and the second comparator is configured to output a signal for operating the warning unit,
when the signal output by the position detecting sensor exceeds the first reference output but does not exceed the second reference output, power is supplied to the motor by the output signal of the first comparator to operate the blower, and the warning unit is disabled by the output signal of the second comparator, and
when the signal output by the position detecting sensor exceeds the first reference output and also the second reference output, the blower is operated by the output signal of the first comparator and the warning unit is operated by the output signal of the second comparator.

6. The mask device with blower according to claim 5, wherein
said position detecting sensor is includes a photo interrupter that includes a light emitting element and a light receiving element,
the exhaust valve is configured to reflect light that is emitted from the light emitting element and received by the light receiving element, and
the light receiving element is configured to detect an amount of received light and output the signal indicating the exhaust valve moving with respect to the first valve seat.

7. The mask device with blower according to claim 5, wherein
the exhaust valve is formed of a material in which a magnetic body is mixed, and
the position detecting sensor includes a magnetic resistance effect element with a resistance variable depending on a strength of a detected magnetism.

8. The mask device with blower according to claim 5, wherein
a signal line of the signal output by the position detecting sensor is connected to the other terminal of the first comparator and also to the other terminal of the second comparator;
when an input voltage corresponding to the signal output by the position detecting sensor exceeds the first reference output but does not exceed the second reference output, power is supplied to the motor by the output signal of the first comparator to operate the blower, and the warning unit is disabled by the output signal of the second comparator; and when the input voltage corresponding to the signal output by the position detecting sensor exceeds the first reference output and also the second reference output, power is supplied to the motor by the output signal of the first comparator to operate the blower, and the warning unit is operated by the output signal of the second comparator.

* * * * *